United States Patent
Katayama et al.

[11] Patent Number: 5,830,285
[45] Date of Patent: Nov. 3, 1998

[54] FINE GRAPHITE UNIFORM DISPERSION STEEL EXCELLENT IN COLD MACHINABILITY, CUTTABILITY AND HARDENABILITY, AND PRODUCTION METHOD FOR THE SAME

[75] Inventors: Sakae Katayama; Toshimi Tarui; Masahiro Toda, all of Futtsu; Ken-ichiro Naito, Muroran, all of Japan

[73] Assignee: Nippon Steel Corporation, Tokyo, Japan

[21] Appl. No.: 700,355

[22] PCT Filed: Feb. 24, 1995

[86] PCT No.: PCT/JP95/00276

§ 371 Date: Aug. 23, 1996

§ 102(e) Date: Aug. 23, 1996

[87] PCT Pub. No.: WO95/23241

PCT Pub. Date: Aug. 31, 1995

[30] Foreign Application Priority Data

Feb. 24, 1994 [JP] Japan .................................. 6-26939
Aug. 24, 1994 [JP] Japan ................................. 6-220803
Aug. 24, 1994 [JP] Japan ................................. 6-220804

[51] Int. Cl.$^6$ ............................ C22C 38/04; C22C 38/06
[52] U.S. Cl. ......................... 148/320; 148/654; 420/121; 420/123; 420/128
[58] Field of Search ................................... 148/654, 320; 420/121, 123, 128

[56] References Cited

U.S. PATENT DOCUMENTS 5,476,556 12/1995 Hoshino et al. ........................ 148/654

FOREIGN PATENT DOCUMENTS 49-67817 7/1974 Japan .
53-46774 12/1978 Japan .
2-111842 4/1990 Japan .
4-124216 4/1992 Japan .

OTHER PUBLICATIONS

Patent Abstracts of Japan, vol. 95, No. 10, 30 Nov. 1995 & JP 07 188851 A(Kawasaki Steel Corp.), 25 Jul. 1995.
Patent Abstracts of Japan, vol. 95, No. 10, 30 Nov. 1995 & JP 07 188850 A(Kawasaki Steel Corp.), 25 Jul. 1995.
Patent Abstracts of Japan, vol. 95, No. 8, 29 Sep. 1995 & JP 07 138698 A (Nippon Steel Corp.), 30 May 1995.
"Effect of Pre–quenching Temperatures on the Graphitization of Structural Low Alloy," Tanaka et al., J.Japan Inst.of Metals, vol. 30 (1966), p. 279, published Sep. 24, 1965.
"Pre–Treatments to Enhance Graphitization in a Low Alloy Structural Steel," Fujihira, J.Japan Inst.of Metals, Vol. 43 (1979), p. 640, published Jan. 22, 1979.
"Machinability of Hypo–Eutectoid Graphitic Steels,"Sueyoshi, et al., J.Japan Inst. of Metals, vol. 43 (1979), p. 1285, published Jul. 14, 1988.
"Cold Forgeability and Jachinability after Cold Forging of Hypo–Eutectoid Graphitic Steels", Sueyoshi, et al., J.Japan Inst.of Metals, vol. 53 (1989, p. 206, published Jul. 14, 1988.

*Primary Examiner*—Deborah Yee
*Attorney, Agent, or Firm*—Cushman Darby & Cushman IP Group of Pillsbury Madison & Sutro LLP

[57] ABSTRACT

A fine graphite uniform dispersion steel material excellent in cold workability, cuttability and hardenability, which has graphite finely and uniformly dispersed therein, and a production method for producing the same. The steel contains at least 0.30 to 1.0% of C, 0.4 to 1.3% of Si, 0.3 to 1.0% of Mn, 0.0003 to 0.006% of B, 0.002 to 0.010% of N and 0.05 to 0.20% of Mo as the basic components and contains graphite having a mean particle diameter of not more than 4.0 $\mu$m and a number of particles per unit and of at least 3,000 per mm$^2$. The production method includes at least the steps of cooling the steel having these components at a cooling start temperature of not less than an $A_{r1}$ point, a cooling end temperature of not more than an $M_s$ point and a mean cooling rate of 5° to 100° C./s.

2 Claims, 2 Drawing Sheets

Ferrite + Pearlite
×500

Ferrite + Graphite
×500

Ferrite + Graphite
×500

FINE GRAPHITE UNIFORM DISPERSION STEEL EXCELLENT IN COLD MACHINABILITY, CUTTABILITY AND HARDENABILITY, AND PRODUCTION METHOD FOR THE SAME

This application claims benefit of international application PCT/JP95/00276 filed Feb. 24, 1995.

TECHNICAL FIELD

The present invention is directed to automobile components and industrial machine members that are processed by hardening and tempering after cold working (forging, cutting, etc.), and more particularly to fine graphite uniform dispersion steel and a production method thereof.

BACKGROUND ART

Apheroidizing annealing techniques for cementite have been employed to improve cold forgeability of steels for machine structures such as steel materials of an AiSi1055 class, and free-cutting elements such as sulfur, lead, etc., have been used to improve cuttability. However, cold forgeability and cuttability, and hardenability and cuttability are mutually contradictory characteristics, and it is technically contradictory to simultaneously satisfy all of them.

As one of the technologies for solving these contradictions, a technical paper relating to a graphite dispersion steel is reported in "Journal of the Japan Institute of Metals", Vol. 30, No. 3(1966), p. 279. This technology converts the ferrite plus pearlite structure in the solid phase to the ferrite plus graphite structure by controlling the chemical components of the steel and the annealing condition. The chemical components are 0.24% of C, 1.18% of Si, 0.24% of Mn and 2.03% of Ni, for example, and the graphitization annealing treatment is carried out at a heating temperature of 650° C. for a heating time of about 28 hours. With regard to cold forgeability of the steels of this system, the technical paper "Journal of the Japan Institute of Metals", Vol. 53 (1989), p. 206 reports that when the ferrite plus pearlite structure of a medium carbon steel is converted to the ferrite plus graphite two-phase structure, its hardness drops from Hv 160 to about Hv 110 in terms of Vicker's hardness, and its cold forgeability becomes higher than that of sulfur free-cutting steels. Cuttability is described also in "Journal of the Japan Institute of Metals", Vol. 52(1988), p. 1285. This article reports that when a graphitization ratio becomes great, a cutting resistance main component of force and a cutting resistance feed component of force drop substantially in half, a shear stress decreases as a shear angle becomes great, a coefficient of friction becomes small, and that a curl radius of a chip becomes small, so that processability becomes higher.

However, existing graphite dispersion steels have not been used industrially because, as described in Japanese Examined Patent Publication (Kokoku) No. 53-46774, graphite particles having diameters exceeding 30 μm exist in the mixture of graphite particles obtained by the present technology. In other words, when the sizes of the graphite particles are large and such particles are dispersed non-uniformly, the graphite is not sufficiently dissolved in the austenite at the time of quench hardening, a diffusion distance becomes longer, and the carbon atoms are segregated. In consequence, insufficiency of quench hardness, non-uniformity of quench hardness, and so forth, occur. Particularly when the heating retention time is as short as several seconds as in the case of induction hardening, the steel structure is likely to become a martensite plus ferrite mixed structure. When the graphite particles become coarse, cracks due to cold forging occur, a limit strain becomes small and coarseness of a cutting finish surface becomes great.

Generally, in order to put the graphite precipitation steel into practical application, it is an essential condition to refine and uniformly disperse the graphite. Therefore, the state of art for controlling the grain diameter of the graphite precipitation steel and its dispersion will be described. First, Japanese Unexamined Patent Publication (Kokai) No. 2-111842 describes that BN can be used as a precipitation nucleus for the graphite and that it is effective to limit the oxygen content to not more than 30 ppm. BN is effective for finely precipitating the graphite as is well known in the art. Nonetheless, because BN segregates in the austenite crystal grain boundary, graphite that utilizes this BN as the nucleation site also segregates in the ferrite grain boundary. In other words, uniform dispersion of the graphite by the chemical components has not yet been accomplished.

Next, the state of art of the production method for uniformly dispersing the fine graphite will be described. The concept of promoting graphitization by introducing the graphite nucleation sites is described in "Journal of the Japan Institute of Metals", Vol. 30(1966), p. 279 and No. 7, Vol. 43(1979), p. 640. In other words, these articles describe that carbon supersaturation in ferrite, the martensite transformation strain and the working strain are effective as the graphite precipitation sites.

The prior art technologies using the concept described above will be explained. Japanese Unexamined Patent Publication (Kokai) No. 49-67817 discloses a method which utilizes the carbon supersaturation state (martensite structure) and the martensite transformation strain. This reference provides a production method which comprises hot rolling a steel containing 0.45 to 1.5% of C (total), 0.45 to 1.50% of graphite, 0.5 to 2.5% of Si, 0.1 to 2.0% of Mn, 0.02 to 0.15% of P, 0.001 to 0.015% of S, 0.008 to 0.02% of N, 0.1 to 2.0% of Ni, 0.015 to 0.5% of at least one of Al and Ti and 0.0005 to 0.030% of Ca, reheating it again at 750° to 950° C. for quenching so as to cause the martensite transformation, and reheating the steel further again for annealing at 600° to 750° C. Since this production method does not impart a working strain, the annealing time for graphitization becomes long, and since the heating step is required twice after hot rolling, the production cost becomes high.

Japanese Examined Patent Publication (Kokoku) No. 63-9580 describes a method which utilizes the working strain. This reference discloses a production method comprising hot rolling a steel containing 0.015 to 0.140% of C, not more than 0.3% of Mn, 0.02 to 0.30% of Sol. Al, not more than 0.006% of N, not more than 0.01% of P, not more than 0.010% of S, wherein P (%)×S (%) satisfies the relation P×S≦10×10$^{-6}$, at least one of 0.03 to 2.50% of Si, 0.1 to 4.0% of Ni and 0.03 to 1.00% of Cu, and the balance of Fe and impurities, cold rolling the steel at a reduction ratio of at least 30% so as to introduce the working strain, and then conducting annealing. However, this production method cannot be said to be a practical method because it requires a step capable of cold rolling at a reduction ratio of 30% after hot rolling in the case of a bar steel and a wire rod.

As described above, the chemical components and the production method for obtaining the fine graphite uniform dispersion steel which is excellent in cold machinability, cuttability and hardenability are not yet free from various problems. Therefore, they have not yet been utilized on the industrial scale.

SUMMARY OF THE INVENTION

The present invention is directed to solve the problems described above, and to provide a fine graphite uniform dispersion steel material excellent in cold machinability, cuttability and hardenability, and a production method thereof, by improving the chemical components and production conditions so as to reduce the mean particle diameter of the graphite (mean size of vacancies after quenching) and to uniformly disperse the graphite not only in the grain boundary but also inside the ferrite grains.

The gists of the present invention reside in the following points.

(1) A fine graphite uniform dispersion steel excellent in cold workability, cuttability and hardenability, comprising, in terms of percent by weight, 0.30 to 1.0% of C, 0.4 to 1.3% of Si, 0.3 to 1.0% of Mn, P$\leq$0.03%, 0.010 to 0.055% of S, 0.01 to 0.10% of Al, 0.0003 to 0.006% of B, 0.002 to 0.010% of N and 0.05 to 0.20% of Mo as the basic components and the balance of Fe and unavoidable impurities, and containing 0.3 to 1.0% of graphite having a mean particle diameter of not more than 4.0 $\mu$m and a distribution of particles of at least 3,000 per mm$^2$.

(2) A method for producing a fine graphite uniform dispersion steel excellent in cold workability, cuttability and hardenability, and containing 0.3 to 1.0% of graphite having a mean particle diameter of not more than 4.0 $\mu$m and a distribution of particles of at least 3,000 per mm$^2$, said method comprising: cooling a steel bar comprising, in terms of percent by weight, 0.30 to 1.0% of C, 0.4 to 1.3% of Si, 0.3 to 1.0% of Mn, P$\leq$0.03%, 0.010 to 0.055% of S, 0.01 to 0.10% of Al, 0.0003 to 0.006% of B, 0.002 to 0.010% of N and 0.05 to 0.20% of Mo as the basic components and the balance of Fe and unavoidable impurities, immediately after hot rolling, by a water cooling apparatus disposed at the back of a hot rolling line at a cooling start temperature of not less than an $A_{r1}$ point, a cooling finish temperature of not more than an $M_s$ point and a mean cooling rate of 5° to 100° C./s, further cooling it naturally, and then conducting graphitization treatment at a heating temperature of 600° to 720° C.

BEST MODE FOR CARRYING OUT THE INVENTION

Figure 1A:
FIGS. 1(a), 1(b) and 1(c) are optical microphotographs of the metallic structure of AiSi1055 according to the prior art, a graphite steel according to the prior art and a steel according to the present invention, respectively.

The inventors of the present invention have conducted a series of studies, and have discovered that when Mo is added, the number of graphite particles remarkably increases and the graphite particle size becomes small, and that the sites of precipitation occur both inside the ferrite crystal grains and in the grain boundary and the graphite can be uniformly dispersed.

This is presumably because the crystal structure of Mo$_2$C is the same hexagonal system as that of BN and Mo$_2$C serves as the site of precipitation of the graphite having the same hexagonal system. The reason why the graphite is uniformly dispersed is presumably because Mo$_2$C is uniformly dispersed irrespective of the grain boundary and the inside of the grains.

As described in Japanese Unexamined Patent Publication (Kokai) No. 2-111842, however, it has been considered in the past that Mo is the element which undergoes solid solution in the cementite, delays the decomposition of the cementite and eventually, impedes graphitization in the same way as Cr does. Contrary to this common concept, the inventors of the present invention have paid specific attention to the fact that Mo hardly undergoes solid solution in the cementite, and have found out for the first time that molybdenum carbides serve as the precipitation nuclei of the graphite and have the effect of refining and uniform dispersing the graphite particles.

Next, the production method will be described.

The present inventors have further discovered that the graphite can be refined by cooling a steel bar immediately after hot rolling, by a water cooling apparatus provided at the back of a hot rolling line, at a cooling start temperature of not less than a point $A_{r1}$ and a cooling finish temperature of not more than $M_s$ and a mean cooling rate of 5° to 100° C./s, further subjecting the steel bar to natural cooling and thereafter carrying out a graphitization treatment at a heating temperature of 600° to 720° C. It is believed that the total quantity of the strain in the martensite increases because the rolling strain remaining in the martensite is added due to rapid cooling after hot rolling in addition to the martensite transformation strain, and consequently, the nucleation site of the graphite increases.

The reasons for limitations in the present invention will be explained below. As to the first invention, the lower limit value of C is set to 0.30% in order to secure the strength after quenching and to secure the quantity of the graphite necessary for obtaining sufficient cutting performance. Its upper limit is set to 1.0% in order to prevent its quenching crack at the time of heat-treatment after cold working.

Si is an indispensable element because it has small bonding power with the carbon atoms in the steel and is one of the useful elements for promoting graphitization. Si must be added so as to precipitate a sufficient quantity of the graphite and to obtain a high graphitization ratio by the quenching+annealing treatments. Therefore, its lower limit value must be at least 0.4%. When the amount exceeds 1.3%, however, the Si content which undergoes solid solution in the ferrite phase increases and the hardness becomes higher, though the graphitization ratio becomes high, so that cold workability drops. Since the reduction effect of the hardness by graphitization is thus cancelled, the upper limit is set to 1.3%.

The quantity of Mn to be added is the sum of the quantity necessary for fixing and dispersing sulfur as MnS in the steel and the quantity necessary for causing its solid solution in the matrix and so securing the strength, and its lower limit value is 0.3%. When the Mn quantity becomes great, graphitization is remarkably impeded. Therefore, its upper limit value is set to 1.0%.

P exists as phosphorus compounds precipitated in the grain boundary inside the steel and as P which has undergone solid solution in the ferrite. Though P improves cuttability, it remarkably deteriorates hot machinability. Therefore, its upper limit is set to 0.03%.

S combines with Mn and exists as MnS inclusions. When the quantity of the MnS inclusions in the steel increases, the chances of the contact between a tool and the MnS inclusions increases, and the MnS inclusions undergo plastic deformation on the face of the tool and form a film. As a result, the chances of the contact between the ferrite and the tool decreases, coagulant is restricted and performance of the cut finish surface can be improved. To restrict the coagulant, the lower limit value of S must be at least 0.01%. Since S deteriorates cold forgeability, its upper limit value is set to 0.055%.

Al removes oxygen in the steel as oxide type inclusions. To adjust the crystal grain size, at least 0.01% of Al must be added. Since the deoxidization effect becomes saturated at the Al content of 0.10%, its upper limit value is set to 0.10%.

B and N form BN and reduce the graphitization annealing time. To sufficiently obtain this reduction effect, at least 0.0003% of B must be added. When the B content exceeds 0.006%, however, the reduction effect becomes saturated. Therefore, its upper limit is set to 0.006%. The quantity of N is within the range of 0.002 to 0.010% so as to convert B in the range of 0.0003% to 0.006% to BN.

Mo plays the role of serving as the formation sites of the graphite nuclei. In order to reduce the mean particle size (to not more than 4 μm) by setting the number of the graphite particles to 3,000 per mm², more than a fixed number of the nucleation sites should be secured.

Therefore, at least 0.05% of Mo must be added. As a result, uniform dispersion can be accomplished both inside the ferrite grain boundary and inside the particles. When the Mo content exceeds 0.20%, the effect described above becomes saturated, and the hardness of the ferrite base rises. Therefore, its upper limit value is set to 0.20%.

From the aspect of hardenability, the upper limit of the mean particle size of the graphite must be 4 μm. When it exceeds 4 μm, the quenched structure becomes a mixed structure of the ferrite and the martensite, and the non-uniformity of the hardness becomes remarkable. When the number of particles of the graphite is less than 3,000 per mm², the distance between the graphite particles becomes great and the diffusion distance of the carbon becomes great, too. Therefore, the quenched structure becomes an incomplete quenched structure of the martensite and the ferrite. Therefore, the lower limit value must be 3,000 per mm². To graphitize substantially the whole quantity of C in the steel, the lower limit value of the graphite must coincide with the lower limit value of the C content, that is, 0.30%, and its upper limit value must coincide with the upper limit value of the C content, that is, 1.0%.

Next, the reasons for limitation of the chemical components and the production condition in the second invention of the present invention will be described. The limitations for C, Si, Mn, P, S, Al, B, N and Mo are exactly the same as those in the first invention. As to the production condition, the reason why the steel material immediately after hot finish rolling is forcibly cooled by the water cooling apparatus provided on the extension of the hot rolling line is to leave the rolling strain due to hot rolling in the quench martensite structure. According to this method, heat energy of the steel material under the red heat state after hot rolling can be utilized for quenching and reheating is not necessary. As a result, the heat-treatment cost can be reduced.

The cooling start temperature measured on the surface of the steel material must be not less than the $A_{r1}$ point in order to simultaneously generate the martensite transformation strain and the rolling strain and to increase the number of the graphite formation sites. To sufficiently obtain the martensite transformation structure and to make it easy to form the graphite, the cooling finish temperature must be not more than the $M_s$ point. The reason why the lower limit value of the mean cooling rate is set to 5° C./s is to obtain the martensite transformation structure and to facilitate graphitization by leaving the working strain. The reason why its upper limit value is set to 100° C./s is because the martensite transformation quantity does not increase even when quenching is carried out beyond this rate. The reasons why the lower and upper limit values of the annealing temperatures are set to 600° C. and 720° C., respectively, are because the graphitization time becomes the shortest within this temperature range.

Next, the effects of the present invention will be described more concretely with reference to Examples thereof.

EXAMPLES

Table 1 tabulates the chemical components and the production conditions as Examples of the steel bars and the wire rods of the present invention. The diameters of the steel bars and the wire rods used for this test were 10 to 30 mm. Each steel bar was cooled by a cooling apparatus disposed on the extension of a hot rolling line by uniformly spraying cooling water at a rate of 0.3 to 0.5 t/m² per unit area to the entire surface of the steel bar. The cooling apparatus was composed of a pipe having a length of 20 m and a large number of holes for spraying cooling water on the circumference thereof, and the steel bar was cooled when it moved on the center line of this pipe. Each wire rod was cooled by passing it through a water cooling tank disposed on the extension of the hot rolling line. The mean cooling rate was determined by dividing the difference between the cooling start temperature and the cooling finish temperature by the cooling time. Thereafter, the testpiece was cooled naturally, and was thereafter subjected to the graphitization treatment by an off-line annealing furnace.

TABLE 1

| | | | | | | | | | | direct quenching after hot rolling | | | | |
|---|---|---|---|---|---|---|---|---|---|---|---|---|---|---|
| | | C (%) | Si (%) | Mn (%) | P (%) | S (%) | Al (%) | Mo (%) | B (%) | N (%) | cooling start temp. (°C.) | cooling finish temp. (°C.) | mean cooling rate °C./s | graphitization annealing temp. (°C.) | graphitization annealing time (hr) |
| steel of this invention | A | 0.55 | 1.15 | 0.55 | 0.011 | 0.023 | 0.016 | 0.10 | 0.003 | 0.004 | 860 | 180 | 86 | 680 | 10 |
| | B | 0.60 | 1.20 | 0.45 | 0.113 | 0.021 | 0.022 | 0.15 | 0.002 | 0.004 | 820 | 100 | 81 | 680 | 10 |
| | C | 0.48 | 1.01 | 0.51 | 0.015 | 0.016 | 0.023 | 0.07 | 0.002 | 0.005 | 810 | 180 | 25 | 660 | 10 |
| | D | 0.52 | 0.70 | 0.79 | 0.011 | 0.035 | 0.025 | 0.20 | 0.003 | 0.003 | 870 | 180 | 10 | 690 | 10 |
| | E | 0.40 | 1.25 | 0.55 | 0.012 | 0.021 | 0.024 | 0.14 | 0.002 | 0.003 | 740 | 210 | 68 | 670 | 10 |
| conventional | F | 0.50 | 0.52 | 1.02 | 0.010 | 0.010 | 0.022 | — | 0.003 | 0.004 | — | — | — | 630 | 20 |

TABLE 1-continued

|  |  | C (%) | Si (%) | Mn (%) | P (%) | S (%) | Al (%) | Mo (%) | B (%) | N (%) | direct quenching after hot rolling | | | graphitization annealing temp. (°C.) | graphitization annealing time (hr) |
|---|---|---|---|---|---|---|---|---|---|---|---|---|---|---|---|
|  |  |  |  |  |  |  |  |  |  |  | cooling start temp. (°C.) | cooling finish temp. (°C.) | mean cooling rate °C./s |  |  |
| steel | G | 0.55 | 0.22 | 0.35 | 0.012 | 0.012 | 0.023 | — | 0.003 | 0.005 | — | — | — | 650 | 25 |
|  | H | 0.52 | 0.51 | 0.72 | 0.013 | 0.015 | 0.023 | — | 0.002 | 0.005 | — | — | — | 610 | 18 |
|  | I | 0.54 | 0.20 | 1.20 | 0.015 | 0.011 | 0.022 | — | 0.002 | 0.004 | — | — | — | 520 | 16 |
|  | J | 0.55 | 0.20 | 1.01 | 0.013 | 0.010 | 0.021 | — | 0.002 | 0.093 | — | — | — | 810 | 12 |

Table 2 tabulates the evaluation results of dispersibility of graphite (graphite particle size, maximum distance between graphites and graphite amount) and its performance (cold forgeability, finish surface coarseness and variation width of hardness after quenching). The measurement method of the graphite particle diameter was as follows. An electron beam was irradiated onto the graphite particles, and an image of the graphite was formed on an SEM screen by digitizing the intensity of the reflected electron beam, and measuring and analyzing the particle diameter by using an analytic system. The area of one field of view was 100 $\mu$m×100 $\mu$m, and the number of the views of field was 25. The total measurement area was 0.25 $\mu$m$^2$. The maximum distance between the graphites was measured on an optical microphotograph at 200×. A circle containing only the portion in which the graphite did not exist was drawn on the photograph, and the maximum value of its diameter was used as the maximum distance between the graphites. The particle diameter of the graphite and the maximum distance between the graphite in the present invention were smaller than those of the steels according to the conventional methods.

according to the present invention respectively. Further, FIG. 2 is an SEM photograph showing in magnification the graphite in the steel according to the present invention. It can be seen that the graphite in the steel according to the present invention microscopically has a form like an aggregate form of spherical graphite. In the conventional graphite steel shown in FIG. 1(b), the graphite was coarse and was segregated, but in the steel according to the present invention, the graphite grains were uniformly dispersed as can be seen from the respective photographs.

Cold forgeability was evaluated by a compression test. Each testpiece having a size of $\phi$14 mm×21 mm was compressed at a rate of 200 mm/sec by an oil pressure tester on a tool having concentric grooves. The height of the testpiece at the point of time when a crack appeared on the surface of the testpiece was measured, and the compression ratio (e) was determined in accordance with the following equation:

$$e=\{1-(H/H_0)\}\times 100 \ (\%)$$

where

TABLE 2

|  |  | graphite mean particle diameter $\mu$m | number of graphite particles/mm$^2$ | graphite amount (%) | maximum distance between graphites $\mu$m | working limit (%) | finish surface coarseness Rz ($\mu$m) | range of quenching hardness Hv |
|---|---|---|---|---|---|---|---|---|
| steel of this invention | A | 2.5 | 5300 | 0.55 | 58 | 83 | 12 | 725–750 |
|  | B | 2.3 | 4500 | 0.60 | 55 | 84 | 11 | 735–752 |
|  | C | 3.8 | 3800 | 0.48 | 76 | 83 | 13 | 715–745 |
|  | D | 1.2 | 5200 | 0.52 | 52 | 82 | 10 | 716–742 |
|  | E | 2.2 | 3500 | 0.40 | 60 | 82 | 13 | 718–726 |
| conventional steel | F | 19.9 | 200 | 0.45 | 240 | 71 | 28 | 420–650 |
|  | G | 12.3 | 420 | 0.47 | 280 | 70 | 28 | 480–645 |
|  | H | 8.7 | 1250 | 0.50 | 126 | 73 | 19 | 520–640 |
|  | I | 9.2 | 960 | 0.48 | 170 | 71 | 22 | 389–635 |
|  | J | 20.5 | 250 | 0.49 | 252 | 69 | 29 | 402–638 |

The graphite amount was calculated in accordance with the following formula: (graphite content in steel/carbon content in steel) × 100 (%)

The carbon content and the graphite amount in the steel were determined by chemical analysis. The graphitization ratio of the steel bar according to the present invention exhibited an extremely excellent value of 100%, though the annealing time was as short as about 10 hours. The graphitization ratio was as low as about 50% according to the conventional methods.

Figure 1B:
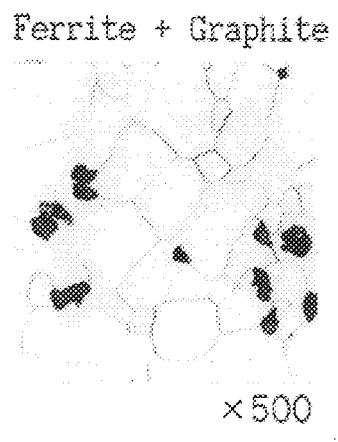
Figure 1C:
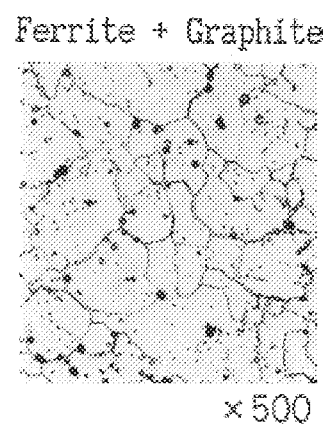
Figure 2:
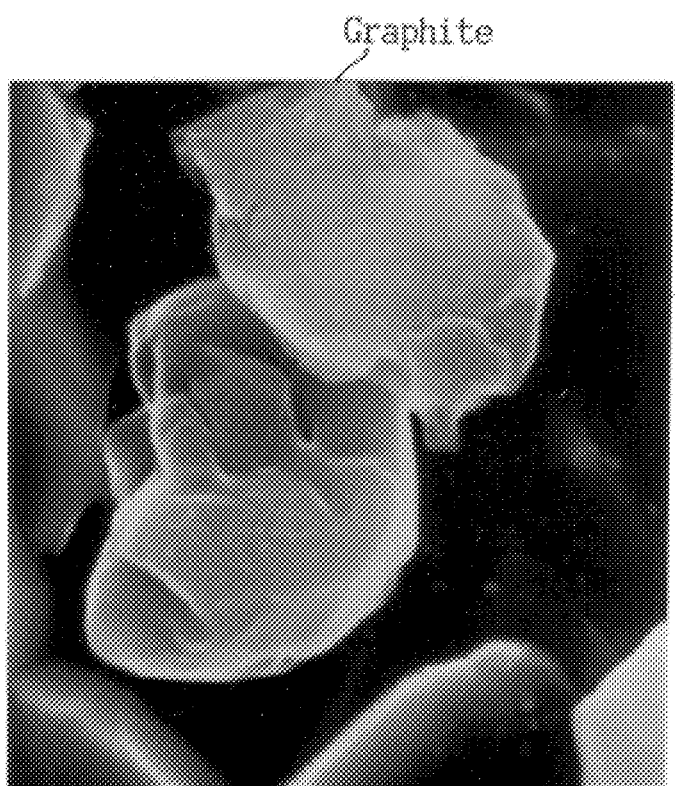
FIG. 2 is an SEM photograph of the metallic structure of a graphite of a steel according to the present invention.

The steel according to the present invention, the steel according to the conventional methods and the graphite steel according to the conventional methods are comparatively shown in FIG. 1. FIGS. 1(a), 1(b) and 1(c) show conventional AiSi1055, the conventional graphite steel and the steel H: height of testpiece after test,
H$_0$: height of testpiece before test.

Whereas the working limit of the conventional steel was about 73% in terms of the compression ratio, the compression ratio was as high as 83% in the steel according to the present invention. Though the difference was 10% in terms of the compression ratio, the logarithmic strains were 1.3 and 1.8, respectively, when the difference was converted to the strain which the blank received. Therefore, there was the difference of 40%.

The finish surface coarseness was evaluated by evaluating the surface cut by a ultra-hard alloy tool coated with TiN by using a probe type coarseness meter. The cutting condition was V=250 m/min, f=0.2 mm/rev, and d=2.0 mm. The finish surface coarseness of the steel according to the present invention was superior.

Hardenability was evaluated by hardening a round bar having a diameter of 25 mm under the graphite precipitation state by induction hardening (1,000° C.×3 sec→water cooling), and then measuring a variation width of the hardness of the section of the round bar. It could be seen that hardenability of the steel according to the present invention was far higher than that of the conventional steel.

As to cuttability, the steel of the present invention was much more improved in comparison with the conventional graphite steel in the aspect of the finish surface coarseness, too, and was by far more excellent than the ordinary lead free-cutting steel. Table 3 illustrates how excellent the service life of a drill boring the steel of the present invention was in comparison with the service life of a drill cutting the existing lead free-cutting steel. This was because the conventional free-cutting steel for a mechanical structure had ferrite and pearlite structures, whereas the graphite steel had a ferrite graphite structure and the hardness of the material itself was overwhelmingly lower in the latter. The chemical components of the existing lead free-cutting steel were 0.41% of C, 0.22% of Si, 1.58% of Mn, 0.057% of S, 0.20% of Pb and 0.0011% of Ca. The drill material was a high speed steel, had a shape of a diameter of 10 mm and a length of 130 mm, and had a tip angle of 118°. The feed was 0.33 mm/rev, and after a large number of holes having a depth of 30 mm were bored, the time at which the drill was completely broken was used as the life. The peripheral speed ($V_{L1000}$) of the drill reaching the drill life when the total of the hole depth was 1,000 mm was used as the judgement reference of approval and rejection of cuttability. The $V_{L1000}$ value of the steel according to the present invention was 146 m/min. In could be understood that this value was extremely better than the value $V_{L1000}$ of 66 m/min of the lead free-cutting steel.

TABLE 3

|  | $V_{L1000}$ | m/min |
|---|---|---|
| Steel of this Invention | A | 146 |
|  | B | 148 |
| Existing lead free-cutting steel |  | 66 |

INDUSTRIAL APPLICABILITY

As can be clearly understood from the Examples given above, the present invention can provide a fine graphite uniform dispersion steel having excellent cold workability, excellent cuttability and excellent hardenability, and has extremely remarkable industrial effects.

We claim:

1. A fine graphite uniform dispersion steel excellent in cold workability, cuttability and hardenability, comprising in terms of percent by weight as the basic components, C: 0.30–1.0%,
Si: 0.4–1.3%,
Mn: 0.3–1.0%,
P: ≦0.03%,
S: 0.010–0.055%,
Al: 0.01–0.10%,
B: 0.0003–0.006%,
N: 0.002–0.010%
Mo: 0.05–0.20%, and the balance consisting of Fe and unavoidable impurities, and containing 0.3 to 1.0% by weight of graphite particles having a mean particle diameter of not more than 4.0 μm and being present in a distribution of at least 3,000 per mm$^2$.

2. A method for producing fine graphite uniform dispersion steel excellent in cold workability, cuttability and hardenability, and containing 0.3 to 1.0% by weight of graphite particles having a mean particle diameter of not more than 4.0 μm and being present in a distribution of at least 3,000 per mm$^2$, said method comprising:

cooling a steel comprising, in terms of percent by weight, as the basic components, C: 0.30–1.0%,
Si: 0.4–1.3%,
Mn: 0.3–1.0%,
P: ≦0.03%,
S: 0.010–0.055%,
Al: 0.01–0.10%,
B: 0.0003–0.006%,
N: 0.002–0.010%
Mo: 0.05–0.20%, and the balance consisting of Fe and unavoidable impurities, immediately after hot rolling, by a water cooling apparatus disposed at the back of a hot rolling line at a cooling start temperature of not less than $A_{r1}$ point, a cooling finish temperature of not more than $M_s$ point and a mean cooling rate of 5° to 100° C./s;

further cooling said steel naturally; and then conducting graphitization treatment at a heating temperature of 600° to 720° C.

* * * * *